(12) United States Patent
Li

(10) Patent No.: US 7,612,955 B2
(45) Date of Patent: Nov. 3, 2009

(54) MULTI-FUNCTION LENS MODULE

(75) Inventor: Rui-Yong Li, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/877,586

(22) Filed: Oct. 23, 2007

(65) Prior Publication Data

US 2008/0144165 A1   Jun. 19, 2008

(30) Foreign Application Priority Data

Dec. 13, 2006   (CN) .................. 2006 1 0157509

(51) Int. Cl.
*G02B 7/02*  (2006.01)
*G02B 3/08*  (2006.01)
*G02B 7/00*  (2006.01)

(52) U.S. Cl. .............. 359/819; 359/811; 359/741; 359/892

(58) Field of Classification Search .......... 359/892, 359/811, 741
See application file for complete search history.

(56) References Cited

U.S. PATENT DOCUMENTS 4,843,528 A * 6/1989 Pearce-Harvey et al. .... 362/277
6,535,340 B1 * 3/2003 Saruwatari .................. 359/834

FOREIGN PATENT DOCUMENTS

CN   1106927   8/1995
CN   1786759   6/2006

* cited by examiner

*Primary Examiner*—Stephone B Allen
*Assistant Examiner*—Jade R Callaway
(74) *Attorney, Agent, or Firm*—Clifford O. Chi (57) ABSTRACT

A multi-function lens module includes a cylindrical first part and a second part. The first part includes a peripheral side wall and defines an inner space; and the first part has a central axis. The second part is received in the inner space of the first part. The first part is capable of rotating relative to the second part. The first part defines at lease two pairs of openings. Each pair of openings is symmetric about the central axis. A first pair of the openings is configured for accommodating first optical elements. A second pair of the openings is configured for accommodating second optical elements. The second part defines a first through hole. The first through hole receives a third optical element.

10 Claims, 10 Drawing Sheets

MULTI-FUNCTION LENS MODULE

BACKGROUND

1. Technical Field

The present invention relates to optical imaging field and, particularly, to a lens module with multiple functions.

2. Description of Related Art

With the development of the optical imaging technology, lens modules are widely used in a variety of electronic devices, such as digital cameras and mobile phones.

Generally, a typical lens module has a particular function, for example, visible light imaging or infrared imaging. In order to achieve a first function (e.g., visible light imaging), a first lens module has been adopted. In order to achieve a second function (e.g., infrared imaging), a second lens module has been used.

Usually, the first lens module and the second lens module are typically placed in separate camera devices. Thus, the cost of achieving different functions has tended to be high. When a camera device has been developed that has proven capable of coupling with the first lens module and the second lens module at the same time, such camera device has generally had a complex structure. Furthermore, it has shown to be inconvenient to shift between the first lens module and the second lens module.

It is therefore desirable to find a new lens module, which can overcome the above mentioned problems.

SUMMARY

An exemplary multi-function lens module includes a cylindrical first part and a second part. The first part defines an inner space having a central axis, and a peripheral side wall. The second part is received in the inner space of the first part. The first part is capable of rotating relative to the second part. The first part has at least two pairs of openings defined at the peripheral side wall and in communication with the inner space. Each pair of the openings is symmetric about the central axis. A first pair of the openings is configured for accommodating first optical elements therein. A second pair of the openings is configured for accommodating second optical elements therein. The second part defines a first through hole therein. The first through hole receives a third optical element therein.

BRIEF DESCRIPTION OF THE DRAWINGS

Many aspects of the present multi-function lens module can be better understood with reference to the following drawings. The components in the drawings are not necessarily drawn to scale, the emphasis instead being placed upon clearly illustrating the principles of the present multi-function lens module. Moreover, in the drawings, like reference numerals designate corresponding parts throughout the several views.

DETAILED DESCRIPTION OF THE EMBODIMENTS

Embodiments will now be described, in detail, below with reference to the drawings.

Figure 1:
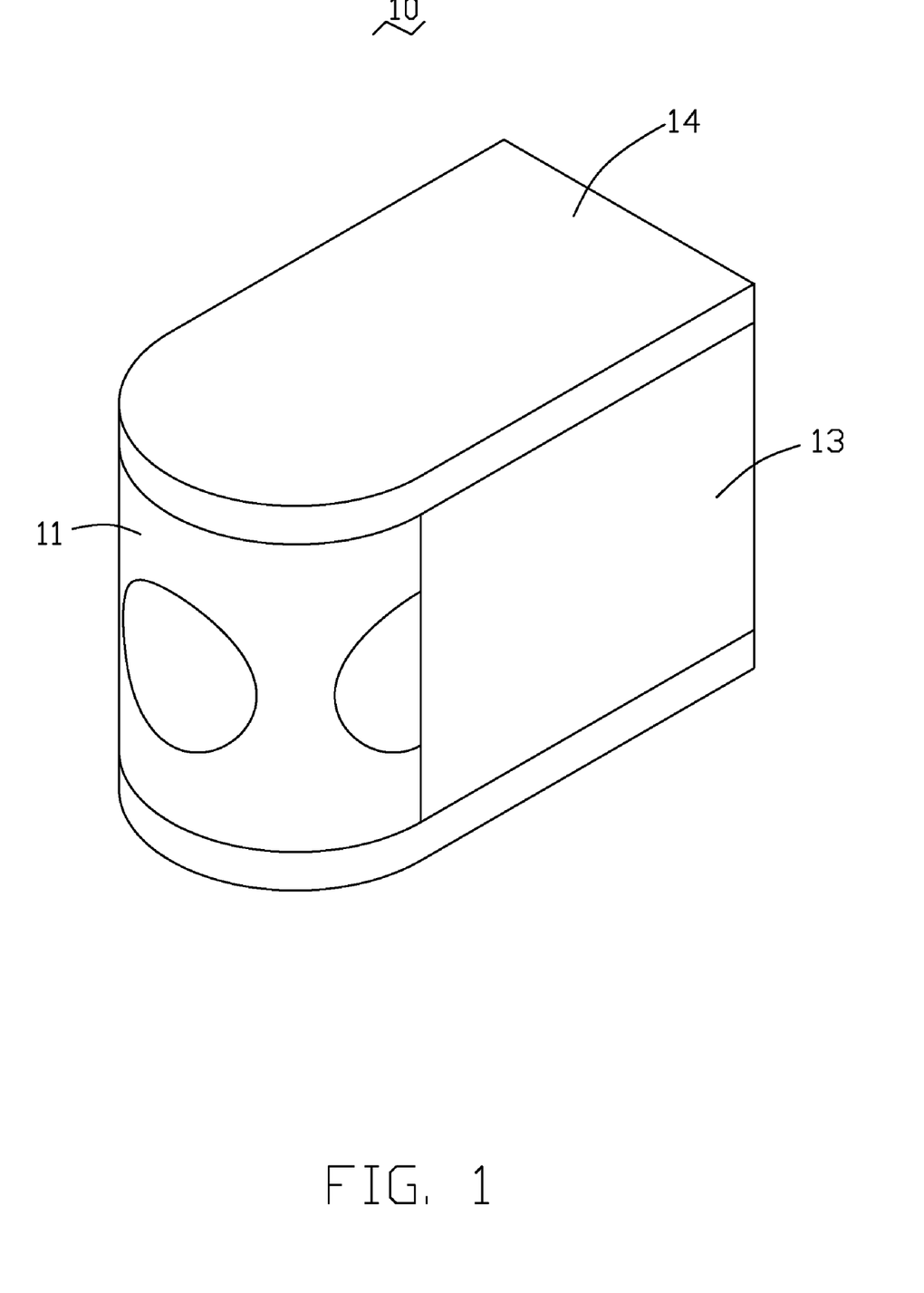
FIG. 1 is a schematic, isometric view of a multi-function lens module, according to a first embodiment.
Figure 2:
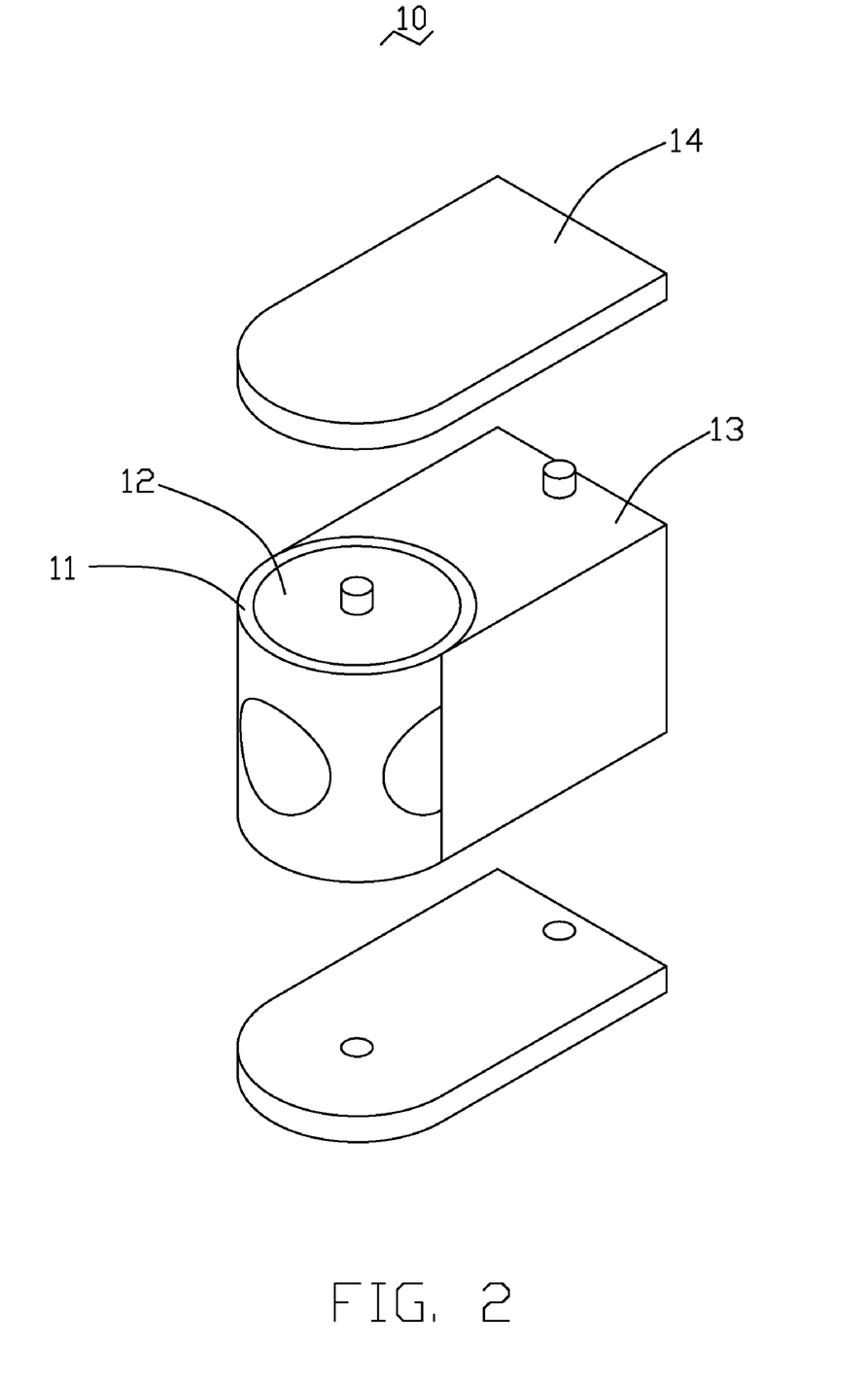
FIG. 2 is a first schematic, exploded isometric view of the multi-function lens module of FIG. 1.
Figure 3:
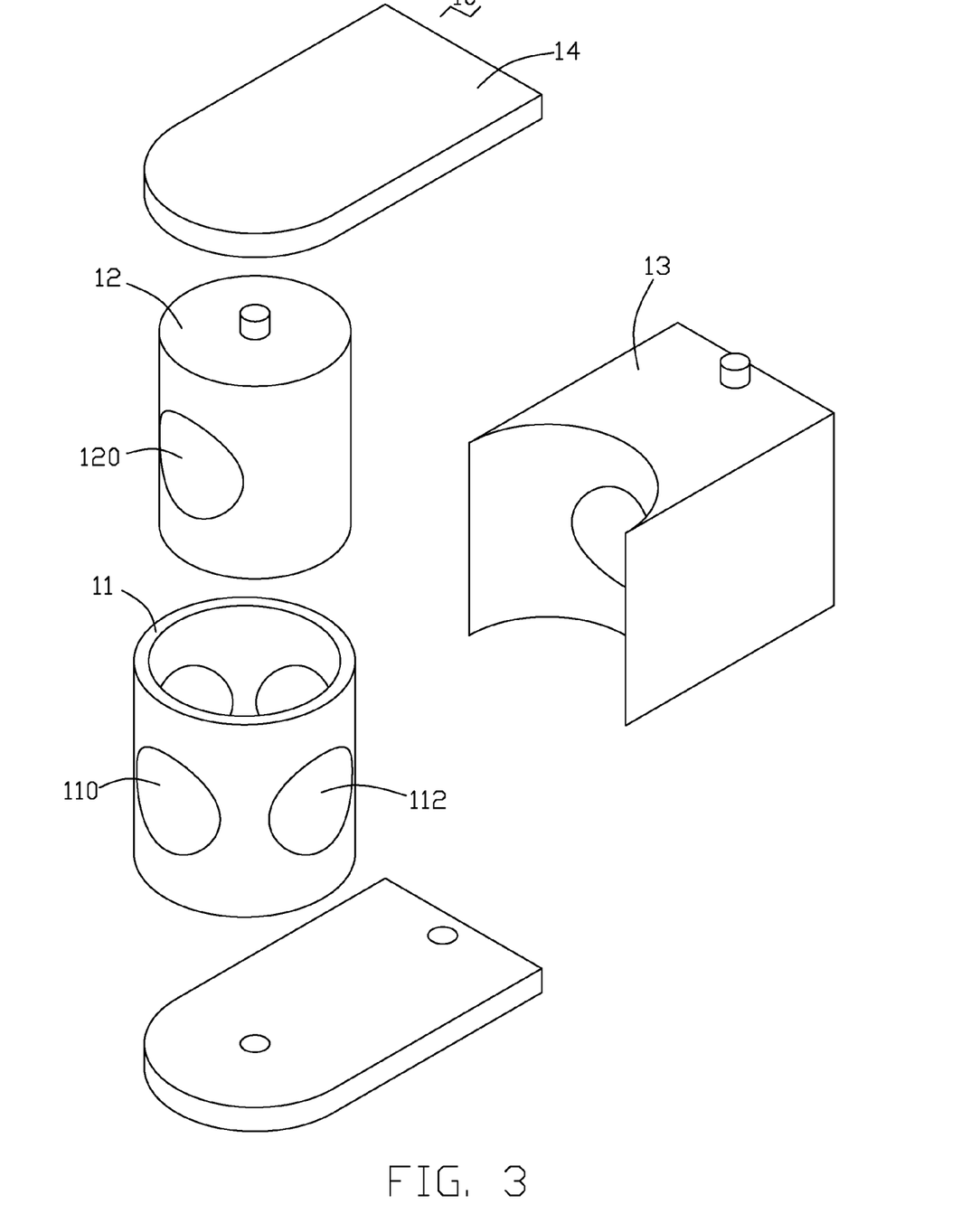
FIG. 3 is a second schematic, exploded isometric view of the multi-function lens module of FIG. 1.

Referring to FIGS. 1 to 3, a multi-function lens module 10 of a first embodiment is shown. The multi-function lens module 10 includes a first part 11, a second part 12, a third part 13, and two plates 14. The second part 12 (i.e., interior holder) is received/mounted in an arcuate receiving portion of the first part 11 (i.e., exterior rotatable holder). The first part 11, the second part 12, and the third part 13 are sandwiched between the two plates 14. The second part 12 and the third part 13 are fixedly positioned/mounted between the two plates 14. The first part 11 is rotatable relative to the second part 12. Such a mounting configuration enables a first though hole 120 of the first part 12 to align with a second though hole 130 of the third part 13 (see FIGS. 3 and 7; described in detail later).

Figure 4:
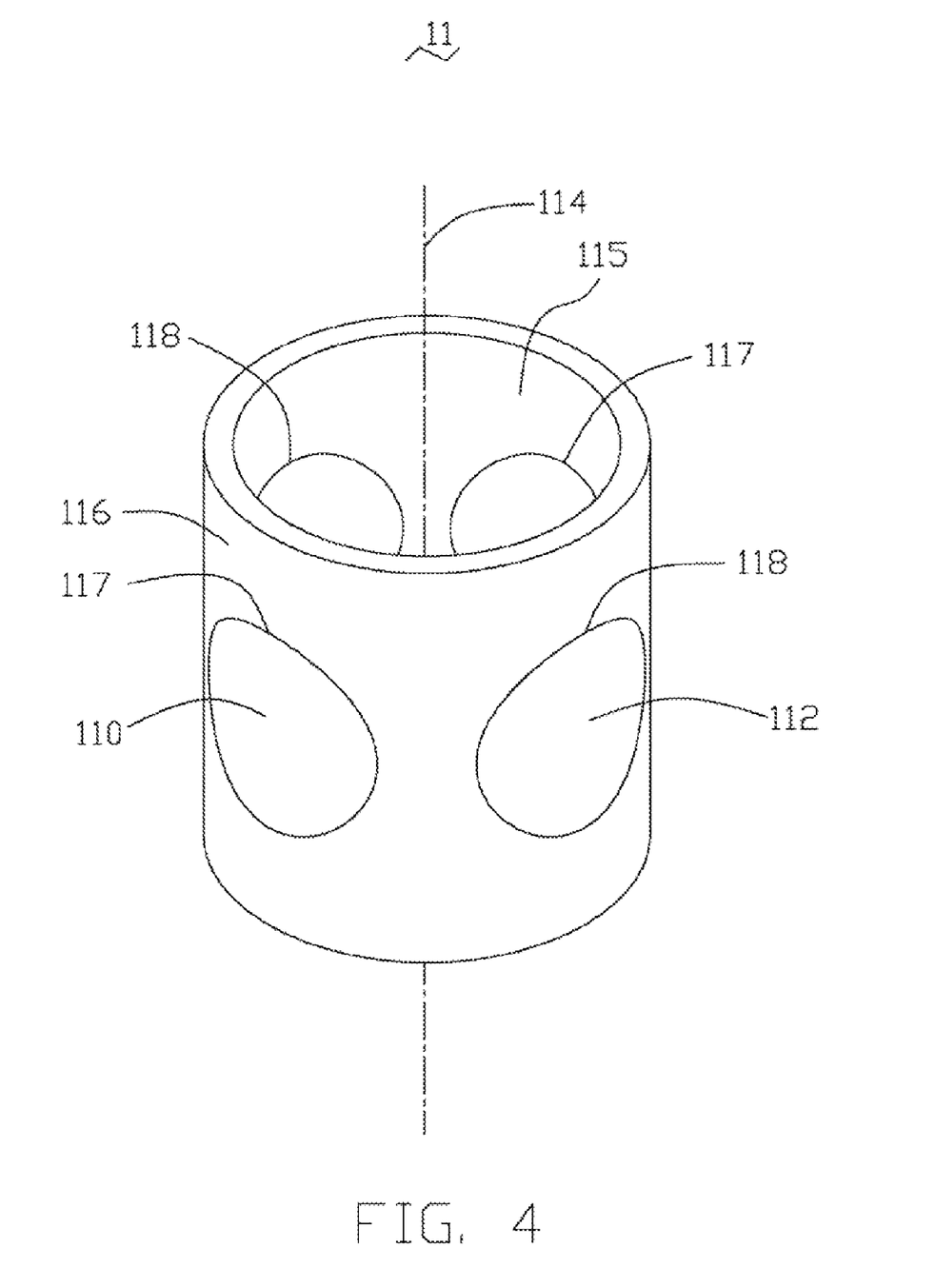
FIG. 4 is a schematic, perspective view of a first part of the multi-function lens module of FIG. 1.

Referring to FIG. 4, the first part 11 is a hollow cylinder, which includes a peripheral side wall 116 and defines an inner space 115. The first part 11 has a central axis 114. The first part 11 also has a first pair of openings 117 and a second pair of openings 118 defined at the peripheral side wall 116 and in communication with the inner space 115. The openings 117, 118 are separated, with respect to the central axis 114, in an equiangular manner. Each pair of openings 117, 118 is, advantageously, symmetric about the central axis 114. The first pair of openings 117 is configured (i.e., structured and arranged) for accommodating first optical elements 110, for example, infrared-cut filters. The second pair of openings 118 is configured for accommodating second optical elements 112, for example, infrared filters. In operation, the first part 11 is driven to rotate by, for example, gears (not shown) such that the first optical elements 110 and the second optical elements 112 respectively couple with the other parts (e.g., the second part 12 and the third part 13) (described in detail later).

It also should be noted that the first part 11 can have more than two pairs of recesses therein, with each pair of recesses usefully being symmetric about the central axis of the first part 11.

Figure 5:
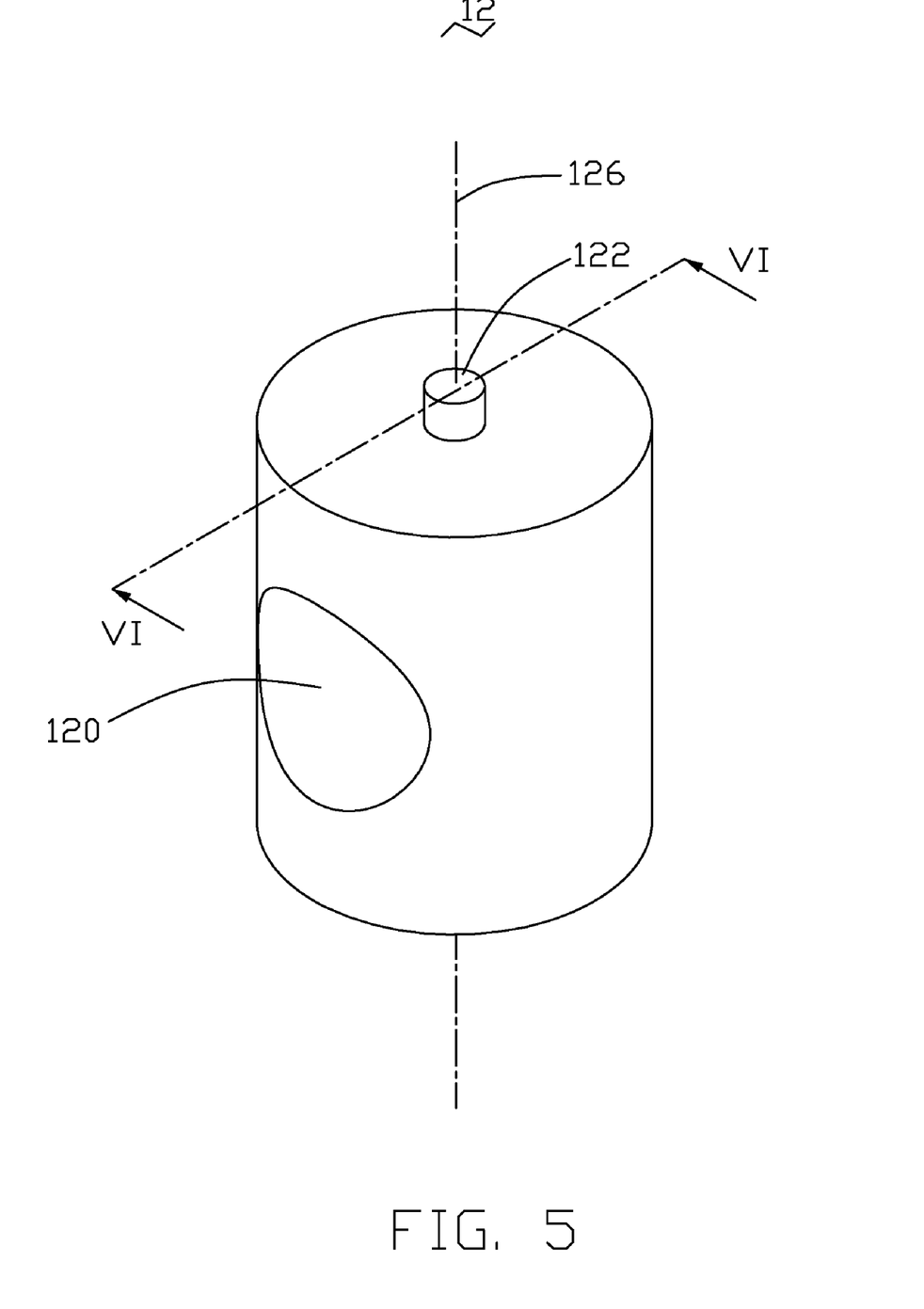
FIG. 5 is a schematic, perspective view of a second part of the multi-function lens module of FIG. 1.
Figure 6:
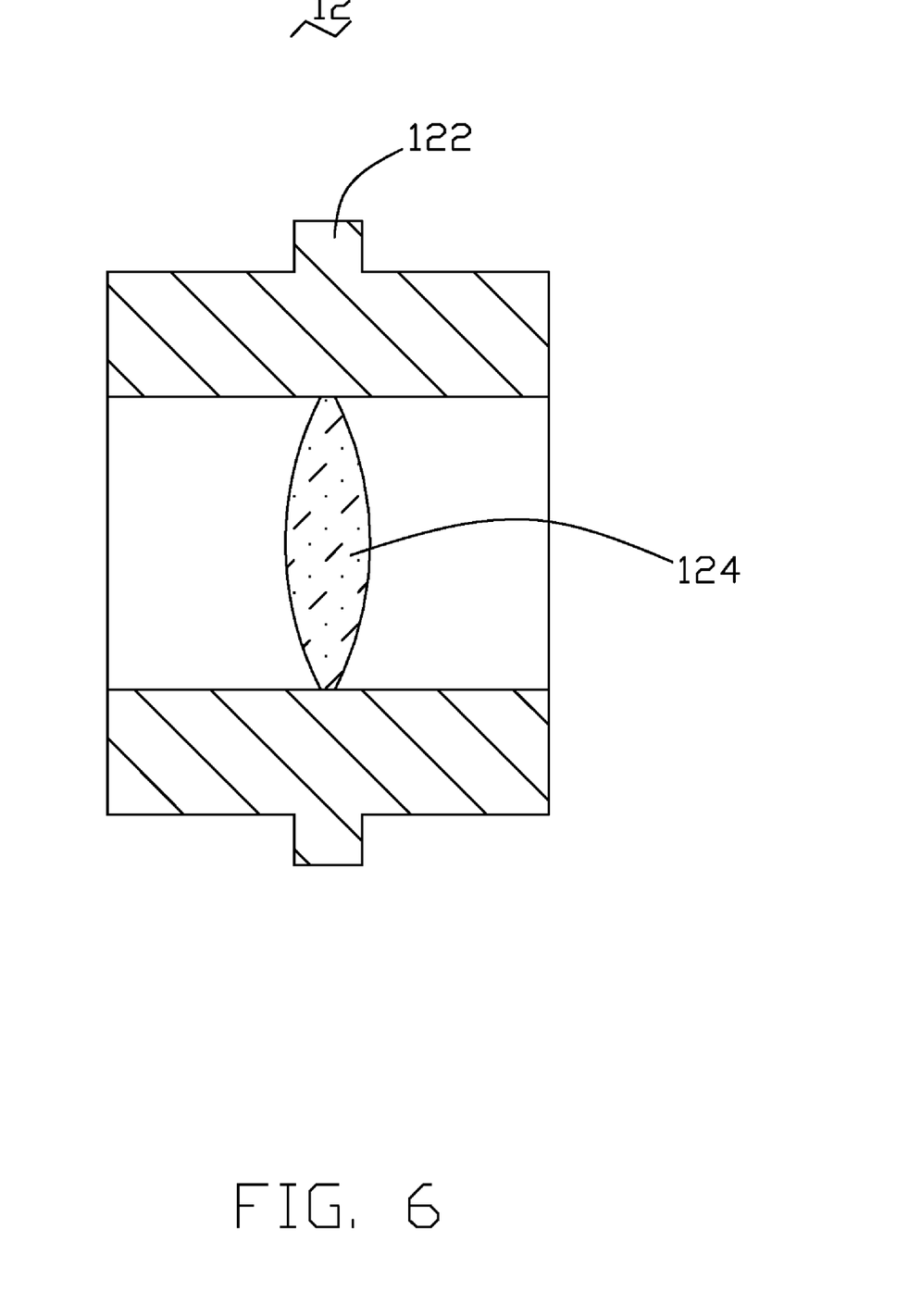
FIG. 6 is a schematic, cross-sectional view of the second part of FIG. 5, taken along the line VI-VI thereof.

Referring to FIGS. 5 and 6, the second part 12 is cylindrical and is sized so as to be slidably received within the first part 11 (i.e., the inner diameter of the first part 11 and the outer diameter of the second part 12 are approximately equal). The second part 12 defines the first through hole 120. The first through hole 120 receives a third optical element 124 therein. The second part 12 has a pair of protrusions 122 (one of which is shown) extending along an axis 126 thereof. Such protrusions 122 permit the second part 12 to be fixedly positioned/mounted to the respective plates 14. Thus, when the first part 11 is driven to rotate, the first optical elements 110 and the second optical elements 112 couple with the third optical element 124 respectively (See FIG. 3; described in detail later).

Figure 7:
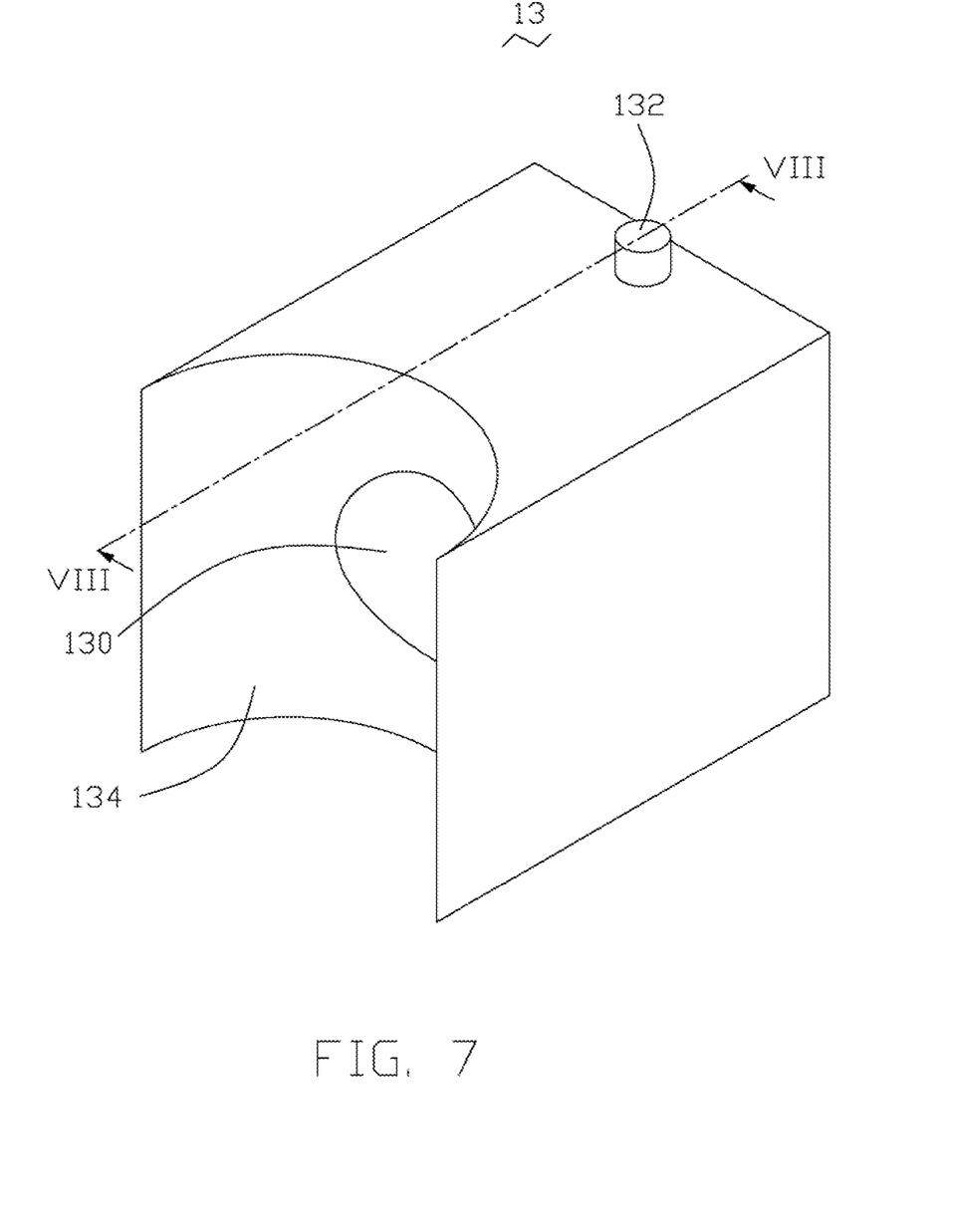
FIG. 7 is a schematic, isometric view of a third part of the multi-function lens module of FIG. 1.
Figure 8:
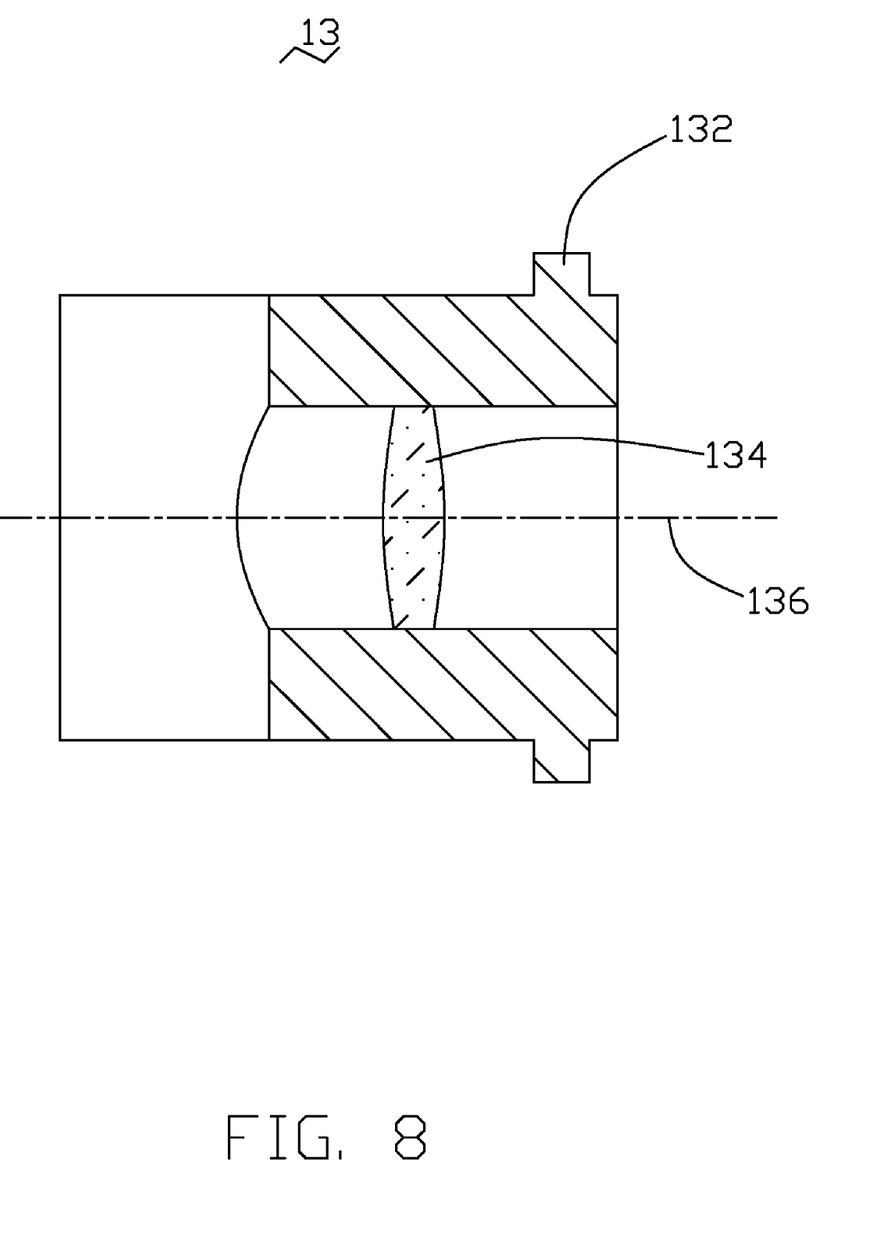
FIG. 8 is a schematic, cross-sectional view of the third part of FIG. 7, taken along the line VIII-VIII thereof.

Referring to FIGS. 7 and 8, the third part 13 is primarily block-shaped and has a semicylindrical receiving space 134.

The the second through hole 130 is in communication with the semicylindrical receiving space 134. The semicylindrical receiving space 134 rotatably receives the first part 11. The second through hole 130 receives a fourth optical element 134 therein. The third part 13 has a pair of protrusions 132 (one of which is shown) extending along a direction perpendicular to an axis 136 of the second through hole 130. The protrusions 132 allow the third part 13 to be fixedly positioned/mounted to the respective plates 14. After the third part 13 is assembled with the other parts, the second through hole 130 aligns with the first through hole 120 of the second part 12 (see FIG. 5). It should be noted that the third part 13 can have another shape, for example, a cuboid shape.

Figure 9:
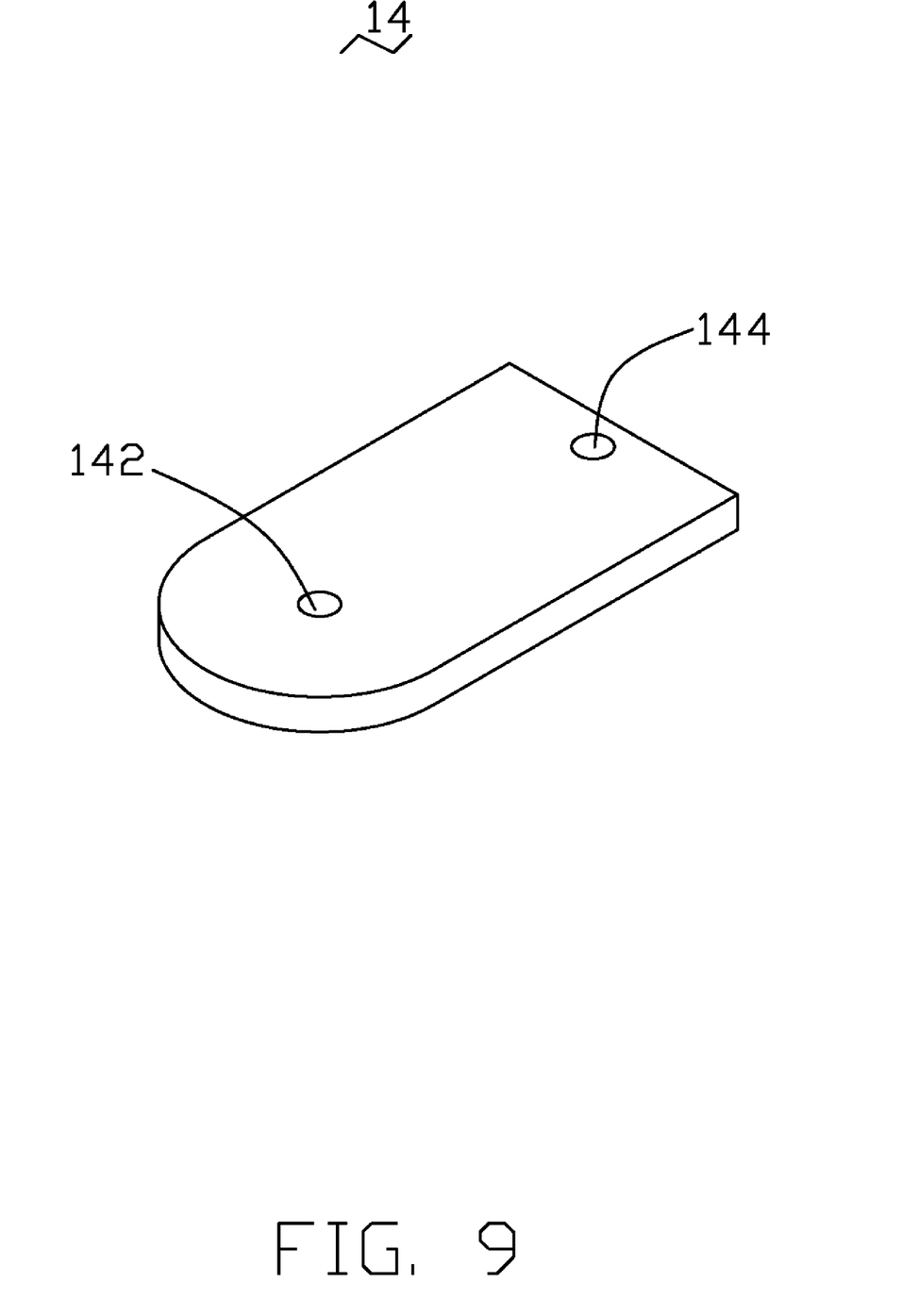
FIG. 9 is a schematic, isometric view of a plate of the multi-function lens module of FIG. 1.

Referring to FIG. 9, each plate 14 defines a first receiving hole 142 and a second receiving hole 144 therein. The first receiving hole 142 is configured for receiving the protrusion 122 of the second part 12 (See FIG. 5). The second receiving hole 144 of a given plate 14 is configured for receiving a respective protrusion 132 of the third part 13 (See FIG. 7). The second part 12 is fixedly mounted between the two plates 14 via, e.g., an adhesive, or a mechanical fastener at the protrusions 122 (See FIG. 1). Thus, when the first part 11 is driven to rotate, the first optical elements 110 and the second optical elements 112 couple with the second part 12 respectively (See FIG. 3). The third part 13 is fixedly mounted between the two plates 14 via, e.g., an adhesive, or a mechanical fastener at the protrusions 132.

Referring to FIG. 3 again, in operation, when the first optical elements 110 align with the first through hole 120, the first optical elements 110 couple with the third optical element 124 (See FIG. 6). Accordingly, the multi-function lens module 10 has a first optical function. After the first part 11 is rotated such that the second optical elements 112 align with the first through hole 120, the second optical elements 112 couple with the third optical element 124 (See FIG. 6). Thus, the multi-function lens module 10 has a second optical function. That is, the multi-function lens module 10 shifts between the first optical function and the second optical function by rotating the first part 11.

Figure 10:
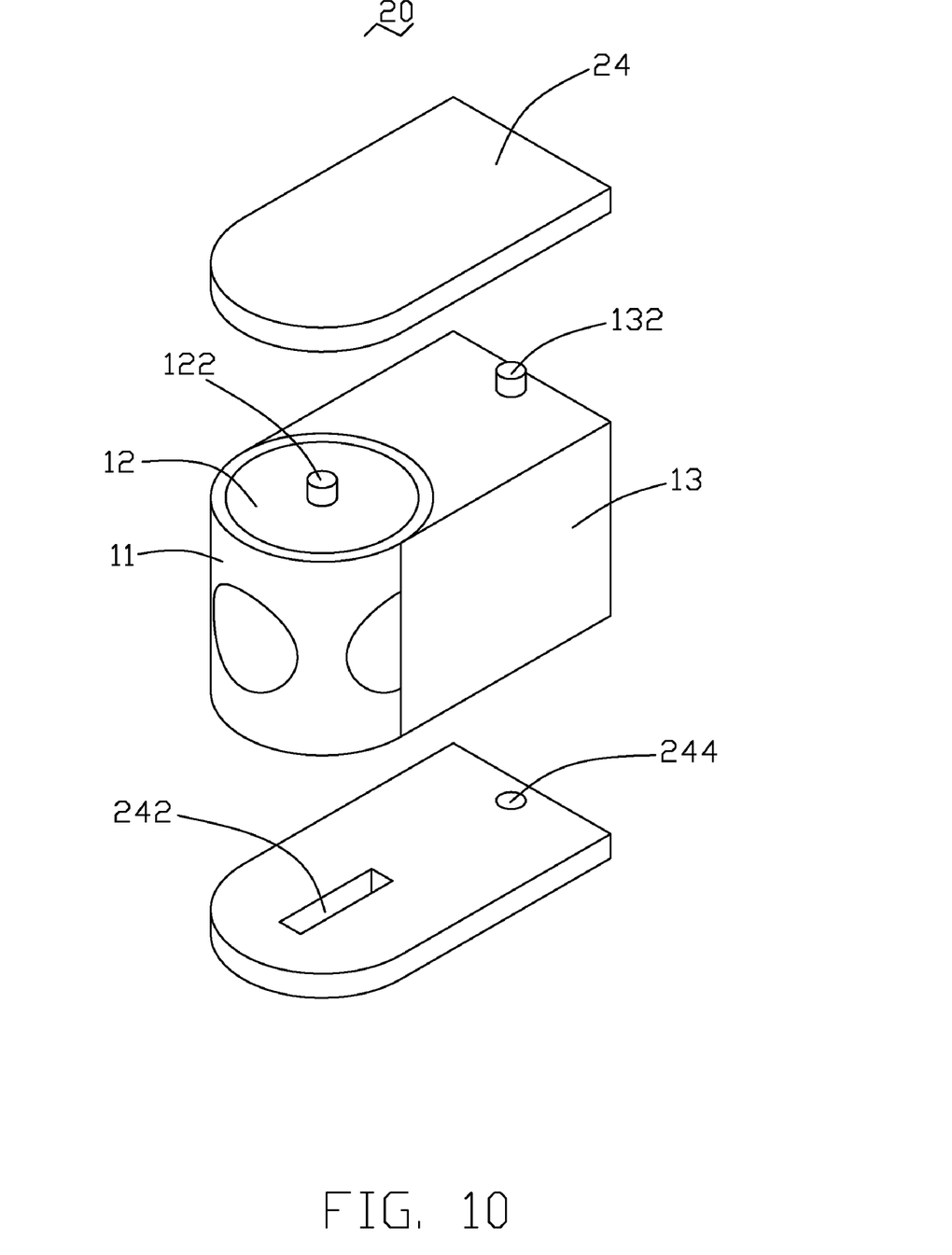
FIG. 10 is a schematic, exploded isometric view of a multi-function lens module, according to a second embodiment.

Referring to FIG. 10, a multi-function lens module 20 of a second embodiment is shown. The multi-function lens module 20 is similar to the multi-function lens module 10, but each of the plates 24 defines a receiving slot 242 and a receiving hole 244 therein. One of the receiving slots 242 is configured for slidably receiving a respective protrusion 122 of the second part 12. The first part 11 and the second part 12, as a whole, can thereby be moved along the slot 242. Thus, a distance between the fourth optical element and other optical elements can be adjusted. By changing the distance between the optical elements, a focal length of the multi-function lens module 20 can be varied. The protrusions 132 of the third part 13 are engaged in the respective receiving holes 244.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A multi-function lens module comprising:
   a hollow cylindrical first part including a peripheral side wall and defining an inner space, the first part having a central axis, the first part also having at least two pairs of openings defined in the peripheral side wall and in communication with the inner space, each pair of openings being symmetric about the central axis, a first pair of the openings being configured for accommodating first optical elements therein, and a second pair of the openings being configured for accommodating second optical elements therein;
   a second part being received in the inner space of the first part, the second part defining a first through hole therein, the first through hole receiving a third optical element therein, the first part being capable of rotating relative to the second part, the second part having at least one protrusion, each protrusion extending from a respective end of the second part and along a direction substantially perpendicular to a central axis of the first through hole; and
   two plates sandwiching the first part and the second part therebetween, each plate defining a receiving slot, and each protrusion being slidably received in a respective receiving slot.

2. A multi-function lens module comprising:
   a hollow cylindrical first part including a peripheral side wall and defining an inner space, the first part having a central axis, the first part also having at least two pairs of openings defined in the peripheral side wall and in communication with the inner space, each pair of openings being symmetric about the central axis, a first pair of the openings being configured for accommodating first optical elements therein, and a second pair of the openings being configured for accommodating second optical elements therein;
   a second part being received in the inner space of the first part, the second part defining a first through hole therein, the first through hole receiving a third optical element therein, the first part being capable of rotating relative to the second part;
   a third part defining a second through hole therein, the second through hole being aligned with the first through hole, and the second through hole receiving a fourth optical element therein; and
   two plates sandwiching the first part, the second part and the third part therebetween.

3. The multi-function lens module as claimed in claim 2, wherein the first part has a semicylindrical receiving space for rotatably receiving the first part, the second through hole being in communication with the semicylindrical receiving space.

4. The multi-function lens module as claimed in claim 3, wherein each plate defines two receiving holes, the second and third parts each having two protrusions extending from two ends of the second and third parts and along directions substantially perpendicular to central axes of the first and second through holes, and the protrusions being engaged in the respective receiving holes.

5. The multi-function lens module as claimed in claim 3, wherein each plate defines a receiving slot and a receiving hole, the second part having two first protrusions each extending from a respective end thereof and along a direction substantially perpendicular to a central axis of the first through hole, the first protrusions being slidably received in the respective receiving slots, the third part having two second protrusions each extending from a respective end thereof and along a direction substantially perpendicular to a central axis of the second through hole, and the second protrusions being engaged in the respective receiving holes.

6. A multi-function lens module comprising:
   a hollow cylindrical first part including a peripheral side wall and defining an inner space, the first part having a central axis, the first part also having at least two pairs of openings defined in the peripheral side wall, each of the openings being in communication with the inner space, each pair of openings being symmetric about the central axis, a first pair of the openings being configured for accommodating first optical elements therein, and a second pair of the openings being configured for accommodating second optical elements therein;

a second part received in the inner space of the first part, the second part defining a first through hole therein, the first through hole receiving a third optical element therein; and a third part having a semicylindrical receiving space for receiving the first part, and a second through hole in communication with the semicylindrical receiving space, the second through hole receiving a fourth optical element therein, the second through hole aligning with the first through hole, and the first part being capable of rotating relative to the second part and the third part between a first position where the first pair of the openings align with the first and second through holes and a second position where the second pair of the openings align with the first and second through holes.

7. The multi-function lens module as claimed in claim 6, further comprising two plates, the first, second and third parts being sandwiched between the two plates, the third part being fixed with the two plates, the second part being fixed with the two plates, and the first part being rotatable relative to the two plates.

8. The multi-function lens module as claimed in claim 7, wherein each plate defines two receiving holes, the second and third parts each having two protrusions extending from two ends of the second and third parts and along directions substantially perpendicular to central axes of the first and second through holes, and the protrusions being engaged in the respective receiving holes.

9. The multi-function lens module as claimed in claim 6, further comprising two plates, the first, second and third parts being sandwiched between the two plates, the third part being fixed with the two plates, the second part and the first part being slidable in unison relative to the two plates, and the first part being rotatable relative to the two plates.

10. The multi-function lens module as claimed in claim 9, wherein each plate defines a receiving slot and a receiving hole, the second part having two first protrusions each extending from a respective end thereof and along a direction substantially perpendicular to a central axis of the first through hole, the first protrusions being slidably received in the respective receiving slots, the third part having two second protrusions each extending from a respective end thereof and along a direction substantially perpendicular to a central axis of the second through hole, and the second protrusions being engaged in the respective receiving holes.

* * * * *